Oct. 3, 1961     E. A. LA BRIE, JR     3,002,370
AXLE LOCK

Filed Sept. 17, 1958     2 Sheets-Sheet 1

INVENTOR.
EUGENE A. LA BRIE, JR.
BY John A. Harvey
ATTORNEY

Oct. 3, 1961     E. A. LA BRIE, JR     3,002,370
AXLE LOCK
Filed Sept. 17, 1958     2 Sheets-Sheet 2
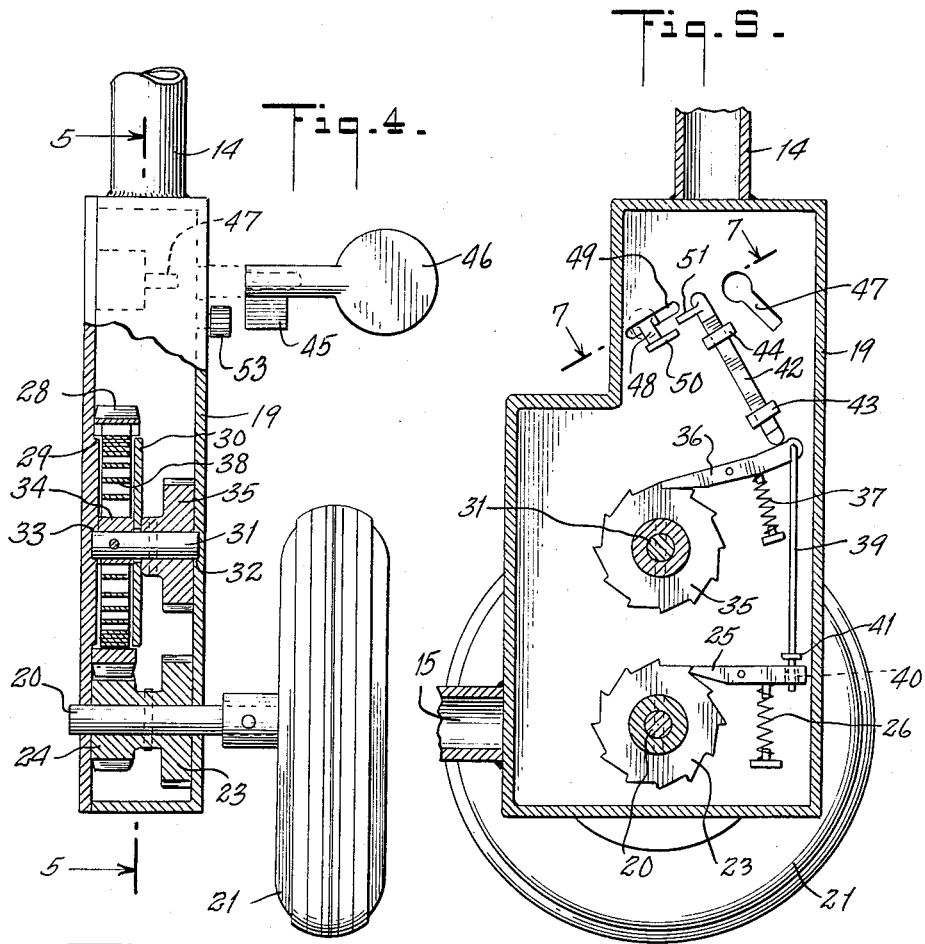
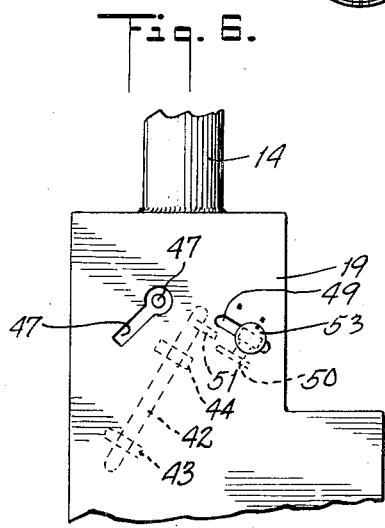
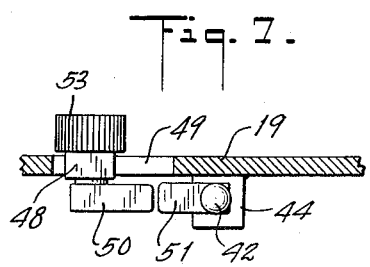
INVENTOR.
EUGENE A. LA BRIE, JR.
BY John A. Harvey
ATTORNEY

3,002,370
AXLE LOCK
Eugene A. La Brie, Jr., 456 Highbridge Road,
Stamford, Conn.
Filed Sept. 17, 1958, Ser. No. 761,562
10 Claims. (Cl. 70—183)

The present invention relates to axle or shaft locking devices which, while having utility in a wide range of diverse applications, are particularly suited for use as a wheel lock for shopping carts and will be described in that connection.

It is the present trend in many large retail establishments to permit the consumer to serve himself from stocked shelves of merchandise. It is the conventional practice, particularly in the larger of these establishments, to furnish shopping carts for use by the consumer while making his selections and carrying them to a check-out counter. In outlying or suburban areas where ample automobile parking areas are provided, the consumer is permitted to wheel the shopping cart beyond the check-out counter and to his parked automobile in order that he may conveniently transfer his purchases to the latter. It has been found in practice, however, that an appreciable number of consumers reside within walking distance of these larger establishments and often wheel the shopping carts to their homes. The carts when so used often are carelessly abandoned by the user or may fail to be returned by him to the establishment from which they were obtained. This practice has resulted in a fairly large and continuing loss of relatively expensive shopping carts, and it would be highly desirable to minimize such losses without embarrassing customer relationships.

It is an object of the present invention to provide a new and improved axle lock which is readily controllable to permit, as desired at any time, either unlimited axial rotation in either direction or a preselected range of axial rotation in one direction only.

It is a further object of the invention to provide a novel lock which has particular utility for use on shopping carts to enable unrestricted movement of a cart within the confines of a business establishment but upon lock selection, accomplish in a simple and relatively foolproof manner, to restrict the range of wheeled movement of the cart to a preselected distance from the exit of the establishment.

It is an additional object of the invention to provide a key controlled axial lock of relatively simple and inexpensive mechanical arrangement yet one of sturdy construction and foolproof operation.

Figure 1:
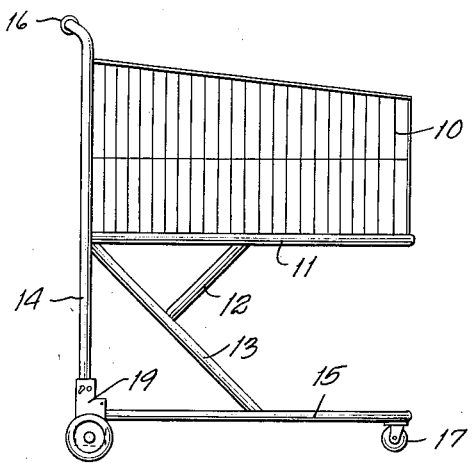
Figure 2:
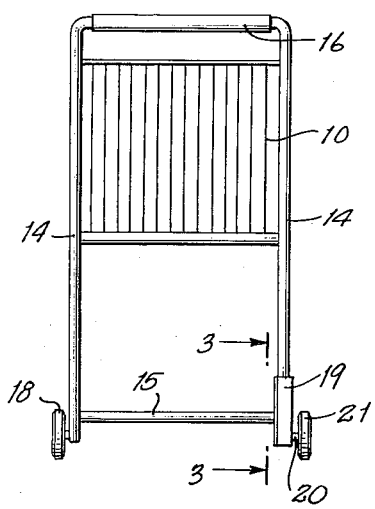

Other objects and advantages of the invention will appear as the detailed description proceeds in the light of the drawings forming a part of this application and in which:

FIGS. 1 and 2 illustrate a shopping cart having in its construction an axle lock embodying the present invention.

Figure 3:
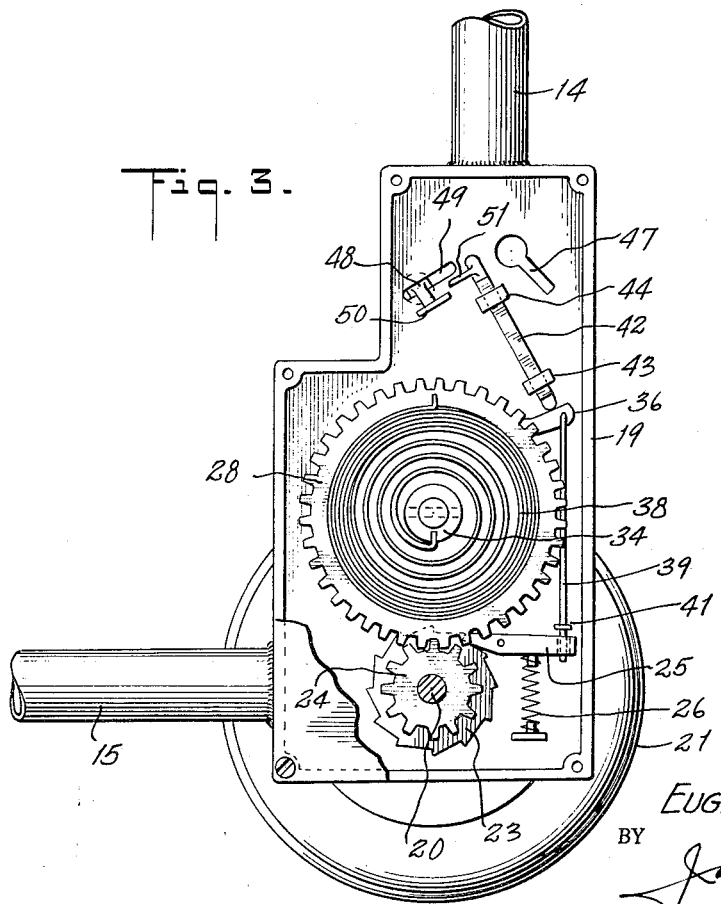

FIGS. 3, 4 and 5 illustrate in cross-section the construction of one form of axle lock embodying the invention; and FIGS. 6 and 7 illustrate details of the construction shown in FIGS. 3, 4 and 5.

Referring now more particularly to FIGS. 1 and 2, the present invention is illustrated as utilized in the construction of a shopping cart having a wire basket 10 supported on a welded tubular framework 11–15 including a vertical U-shaped frame member 14 providing a handle 16 to be manually grasped in pushing the cart. The base frame member 15 is also of U-shaped configuration, open at the rear, and supports swivel casters 17 at its forward end. As shown more clearly in FIG. 2, one leg of the upright rear member 14 supports at its lower end a stud shaft upon which a wheel 18 is freely journalled and the other leg of the member 14 is welded at its lower end to a housing 19 as is also one end of a leg of the base member 15 as shown in FIG. 1. The housing 19 encloses an axle lock embodying the present invention, and presently to be described more fully, and also journals an axle 20 upon which a wheel 21 is fixed.

The construction of the axle lock is illustrated by the cross-sectional views of FIGS. 3, 4 and 5. The axle 20 is rotatably journalled in the side walls of the housing 19 as shown more clearly in FIG. 4, and has affixed thereto within the housing a ratchet wheel 23 and a pinion gear 24. A pivoted pawl 25 is normally biased by a spring 26 into engagement with the ratchet wheel 23, and in engaged position restricts rotation of the axle 20 and wheel 21 to one direction only corresponding to the forward movement of the shopping cart. The pinion gear 24 engages a hollow gear 28. The latter, as shown more clearly in FIG. 4, is rotatably journalled at one end by an inwardly projecting annular portion 29 provided on one wall of the housing 19 and is journalled at its opposite end by a disc 30 supported for rotation upon a stud shaft 31 journalled at 32 and 33 by the opposing walls of the housing 19. A bushing member 34 is affixed to one end of the shaft 33 internally of the gear 28 and a ratchet wheel 35 is affixed to the other end of the shaft 33. As shown more clearly in FIG. 5, a pivoted pawl 36 is normally biased by a spring 37 into engagement with the teeth of the ratchet wheel 35 and when in engagement with the latter restricts the stud shaft 31 to one direction of rotation only. A helical ribbon spring 38 is enclosed within and is connected at one end to the hollow gear 28, and the other end of the spring is affixed to the bushing 34 as shown in FIG. 3. The spring orientation is such that engagement of the pawls 25 and 36 with their respective ratchet wheels 23 and 35 causes the spring to be more tightly wrapped around the bushing 34 during the permitted direction of rotation of the axle 20.

The pawls 25 and 36 are loosely interconnected mechanically by a link member 39 which is pivotally secured to the pawl 36 but merely has its lower end projecting through an aperture 40 of the pawl 25. A collar 41 provided on the link member 39 is sufficiently spaced in relation to the pawl 25 as to permit the pawls 25 and 36 to operate independently of each other in engaging the teeth of their respective ratchet wheels 23 and 35. The spacing of the collar 41 from the pawl 25 is such, however, that if the pawl 36 be positioned (as will presently be described) out of engagement with the teeth of the ratchet wheel 35, the collar 41 engages the pawl 25 and effects a concurrent movement of the latter to a similar position where it is also out of engagement with the teeth of the ratchet wheel 23.

This concurrent positioning of the pawls 25 and 36 out of engagement with their associated ratchet wheels 23 and 35 is effected by a member 42 which is supported for longitudinal movement in apertures provided in studs 43 and 44 formed integral with one wall of the housing 19. The member 42 is normally biased upwardly to the position shown in FIG. 5 by the spring 37 of the pawl 36. The member 42 is movable downwardly, however, by engagement of its upper end by the web 45 of a hollow-shaft key 46 manually inserted through a keyhole 47 in the housing 19 and pivotally positioned by a stud 47 secured to an inside wall of the housing 19 as shown. Manual rotation of the key forces the member 42 downwardly to move the pawls 36 and 25 concurrently to positions where they are out of engagement with their respective ratchet wheels 35 and 23.

The member 42 may be latched in this position by a latch member 48 which is slidably supported in a slot 49 of the housing 19. The latch member carries at its inner end a latch shoe 50 which slides into position over a stud 51 provided on the latch bar 42 and thus retains the latter in the position to which it has been moved by manual actuation of the key 46. As illustrated more clearly in FIG. 6 and the fragmentary cross-sectional view of FIG. 7, the latch member 48 is provided with a knob 53 externally of the housing 19 to enable manual actuation of the latch member 48 to and from latching engagement with the stud 51 of the member 42. To retain the stud 51 in proper position for engagement by the shoe 50 of the latch member 48, the member 42 is either constructed with square cross-section and is supported in apertures of square cross-section provided in the studs 43 and 44 of the housing 19 or is otherwise restrained from rotational movement. Alternatively, the member 42 may be of circular cross-section and be supported in circular apertures in the studs 43 and 44 and in this case the stud 51 is made larger than shown in FIG. 7 so that it slidably engages the inner surface of the housing 19 to prevent rotation of the member 42.

Consider now the operation of the axle lock described and assume its utilization with a shopping cart as illustrated. While the shopping cart is within the business establishment, an attendant inserts his key 46 into the keyhole 47 of the housing 19 and turns the key to actuate the member 42 and move the pawls 25 and 36 to a position out of engagement with their associated ratchet wheels 23 and 35. The attendant then grasps the knob 53 of the latch member 48 and moves it to a position where the shoe 50 of the latch member rides over the stud 51 of the member 42 to retain the latter in the position to which it has been moved. Since the pawl 25 is now positioned out of engagement with its associated ratchet wheel 23, the axle 20 and wheel 21 may be rotated in either direction and thus the cart may be wheeled either forwardly or rearwardly. As the cart is so wheeled in either direction, the pinion gear 24 on the axle 20 drives the hollow gear 28 and with it the helical spring 38 which in turn drives the stud shaft 31 through te collar 34. Since the pawl 36 is also positioned out of engagement with its associated ratchet wheel 35 at this time, the stud shaft 31 may be freely rotated in either direction under actuation of the helical spring 38. Thus it will be clear that the axle lock exerts no restraint on the wheel 21 and the shopping cart may accordingly be wheeled to any distance either forwardly or backwardly as desired.

When the shopping cart is taken beyond the check-out counter of the establishment, the attendant manually grasps the latch knob 53 and moves the latch shoe 50 out of engagement with the stud 51 of the member 42 thus permitting the latter to be moved upwardly under bias of the spring 37. The latch pawls 25 and 36 are thereupon positioned to engage the teeth of their associated ratchet wheels 23 and 35. Engagement of the pawl 25 with the ratchet wheel 23 prevents backward rotation of the shaft 20 and wheel 21 and thus permits the free wheeling of the shopping cart in a forward direction only. At the same time, the pawl 36 now engages the teeth of its associated ratchet wheel 35 and prevents the stud shaft 31 from rotating in a direction which would relieve tension of the helical spring 38. As the shopping cart is wheeled forwardly and the pinion gear 24 drives the hollow gear 28, the helical spring 38 becomes more tightly wrapped around the bushing member 34. The increasing tension of the helical spring 38 cannot be relieved due to the latching action of the pawl 36 and ratchet wheel 35 as just mentioned, nor can it be relieved by the force of the spring exerted through the gears 24 and 28 on the shaft 20 since this force would drive the wheel 21 backwardly but this backward drive is prevented by action of the pawl 25 and ratchet wheel 23 as previously explained.

Thus the shopping cart remains stationary if halted in its forward motion. After the cart has been wheeled forwardly a preselected distance corresponding to the farthest point selected within the parking area of the business establishment, the helical spring 38 becomes so tightly wrapped around the bushing member 34 that the wheel 21 is restrained against any further forward rotation and thereupon becomes locked against both forward and reverse rotation. The shopping cart can now only be moved by lifting this locked wheel out of engagement with the surface upon which it is rolled. This fact acts as a deterrent to removal of the shopping cart beyond the confines of the business establishment. To return the shopping cart back into the establishment, the attendant inserts his key in the wheel lock and moves the member 42 to disengage the pawls 25 and 36 from engagement with their associated ratchet wheels 23 and 35. This permits the ratchet wheel 35 and stud shaft 31 to rotate freely once more and the tension of the spring 38 is thereupon relieved. The member 42 is latched in this position once more by the attendant grasping the knob 53 and engaging the latch 48 with the stud 51, whereupon the shopping cart may now be wheeled back into the establishment and used without restraint therein until such time as latch 48 is again manually actuated to release the member 42 and initiate a new operation of the axle lock to restrain all backward motion of the shopping cart and establish a limitation on its range of forward motion.

It will be evident that the length of the spring 38 and the ratio of the gears 24 and 28 together establish the maximum number of revolutions of the axle 20 once the axle lock is placed in operation by release of the pawls 25 and 36 to engage their respective ratchet wheels 23 and 35. This maximum number of axle revolutions and the diameter of the wheel 21 establish the maximum distance that the cart may be wheeled forward before the wheel becomes locked against further rotation. Thus the operating range desired is established by suitable selection of the length of the spring 38, the ratio of the gears 24 and 28, and the diameter of the wheel 21 considered individually or collectively.

It will be apparent from the foregoing description of the invention that the axle lock of the invention is particularly suited for use on shopping carts to enable unrestricted movement of the cart until a simple and easily effected manual release of a latch restrains all backward movement and permits only a limited range of forward movement of the cart. The axle lock of the present invention has the further advantages that it is of relatively simple and inexpensive mechanical arrangement yet is of sturdy construction and its control operation may be readily made as foolproof as a given application warrants in dictating the complexity of the unlocking key configuration desired.

While a specific form of the invention has been described for purposes of illustration, it is contemplated that possible changes may be made without departing from the spirit of the invention.

I claim:

1. An axle lock comprising, an axle member and means for journalling said axle member for rotation about its axis, a rotation-limit control structure having rotation-limit means mechanically actuated by and movable with said axle member and including lock-selection means co-operating with said rotation-limit means and selectably moveable to two positions in one of which said rotation-limit means allows unrestricted rotation of said axle member in either direction and in the other of which said rotation-limit means allows only a preselected maximum number of rotations of said axle member in one direction, and means mechanically coupled to said axle member and responsive to the positioning of said selection means for allowing unrestricted rotation of said axle member in either direction when said lock selection means is in said one position thereof and for preventing rotation of said axle member in a direction opposite to said one direction thereof when said lock selection means is in said other position thereof.

2. An axle lock comprising, an axle member and means for journalling said axle member for rotation about its axis, rotation-limit means mechanically connected to said axle to be driven thereby and including limit-lock selection pawl and ratchet means moveable between engaged and disengaged positions in the disengaged position of which said limit means is permitted to be driven by said axle and to an unlimited extent and in either direction of axle rotation and in the engaged position of which said limit means is permitted to be driven by one direction of rotation of said axle but only to a preselectably limited extent, and pawl and ratchet means movable into engageable relation in response to positioning of said limit-lock selection means in said engaged position thereof for preventing rotation of said axle in a direction opposite to said one direction thereof.

3. An axle lock comprising, an axle member and means for journalling said axle member for rotation about its axis, a first member mechanically connected to move in unison with the rotation of said axle member in either direction thereof, a second moveable member, lost motion means intercoupling said members to permit an unrestricted range of movement of said first member in either direction when said second member is free to move but to restrict and limit the range of movement of said first member in at least one direction when said second member is restrained from movement, and a pair of pawl and ratchet structures having the pawls thereof selectably actuable concurrently into engagement with individual ones of the ratchets thereof to restrain the movement of said second member and to prevent movement of said first member in a direction opposite to said one direction thereof.

4. An axle lock comprising, an axle member having a ratchet wheel and means for journalling said axle member for rotation about its axis, a first member mechanically connected to move in unison with the rotation of said axle in either direction thereof, a second moveable member including a ratchet wheel, a spring interconnecting said members to permit an unrestricted range of movement of said first member in either direction when said second member is free to move with said first member through said spring interconnection but to restrict and limit the range of movement of said first member in the spring tensioning direction thereof when said second member is restrained from movement, and pawl means selectably actuable concurrently to engage said ratchet wheels to restrain the movement of said second member and to prevent movement of said first member in a direction opposite to said spring tensioning direction thereof.

5. An axle lock comprising, an axle member and means for journalling said axle member for rotation about its axis, a first member rotatably supported and mechanically connected to move in unison with the rotation of said axle member in either direction, a second rotatably supported member, lost motion means intercoupling said first and second members to permit an unrestricted range of movement of said first member in either direction when said second member is free to move but to restrict and limit the range of movement of said first member in at least one direction when said second member is restrained from movement, and means including at least one set of ratchet teeth and a selectably actuable cooperating pawl for restraining the movement of said second member while concurrently preventing movement of said first member in a direction opposite to said one direction thereof.

6. An axle lock comprising, an axle member and means for journalling said axle member for rotation about its axis, a first member rotatably supported and mechanically connected to move in unison with the rotation of said axle member in either direction, a second rotatably supported member, lost motion means intercoupling said first and second members to permit an unrestricted range of movement of said first member in either direction when said second member is free to move but to restrict and limit the range of movement of said first member in at least one direction when said second member is restrained from movement, a set of ratchet teeth and a cooperating pawl selectably positionable to either of two positions in one of which said pawl is disengaged from said ratchet teeth and in the other of which said pawl engages said teeth to restrain the movement of said second member in one direction thereof and thereby effect said restriction on the range of movement of said first member, and means responsive to the positioning of said pawl to said other position thereof for concurrently preventing movement of said first member in a direction opposite to said one direction thereof.

7. An axle lock comprising, an axle member and means for journalling said axle member for rotation about its axis, a first member rotatably supported and mechanically connected to move in unison with the rotation of said axle member in either direction, a second rotatably supported member, lost motion means intercoupling said first and second members and allowing an unrestricted range of movement of said first member in either direction when said second member is free to move but effective to restrict and limit the range of movement of said first member in at least one direction when said second member is restrained from movement, a first ratchet and pawl structure for restraining the movement of said second member in one direction thereof and thereby effect said restriction on the range of movement of said first member, a second ratchet and pawl structure for restraining movement of said first member in a direction opposite to said one direction thereof, and manually actuable means for moving said pawl members in unison between an inoperative position permitting unrestricted movements of said first and second members and an operative position at which said movements of said first and said second members in said respective one and said opposite directions thereof are restrained.

8. An axle lock comprising, an axle member and means for journalling said axle member for rotation about its axis, a first member rotatably supported and mechnically connected to move in unison with the rotation of said axle member in either direction, a second member rotatably supported in concentric relation to said first member, a helical spring having one end connected to said first member and the other end connected to said second member to permit unrestricted range of movement of said first member in either direction when said second member is free to move but to restrict and limit the range of movement of said first member in at least one direction when said second member is restrained from movemnt, and means including at least one set of ratchet teeth and a selectable actuable cooperating pawl for restraining the movement of said second member while concurrently preventing movement of said first member in a direction opposite to said one direction thereof.

9. An axle lock comprising, an axle member having a pinion gear affixed thereto and means for journalling said axle member for rotation about its axis, a hollow gear member journalled to rotate about its axis and having peripheral gear teeth drivingly engaging said pinion gear, said hollow gear member enclosing a helical ribbon spring attached at one end thereto, a second member positioned to extend within said hollow gear member and journalled to rotate about the axis thereof and having attached thereto the other end of said spring, and means selectably actuable between two positions in one of which said first and second members have unrestricted rotational movements and in the other of which said first and second members are each constrained to only that relative rotation therebetween which is effective to wrap said spring more tightly about said second member.

10. An axle lock comprising, an axle member having a pinion gear affixed thereto and means for journalling said axle member for rotation about its axis, a hollow gear member journalled to rotate about its axis and having peripheral gear teeth drivingly engaging said pinion gear, said hollow gear member enclosing a helical ribbon spring attached at one end thereto, a second member positioned to extend within said hollow gear member and journalled to rotate about the axis thereof and having attached thereto the other end of said spring, a ratchet wheel affixed to said axle member and a cooperating pawl spring biased into engagement with the teeth thereof to permit axial rotation only in a direction tending to effect wrapping of said spring more tightly about said second member, a ratchet wheel connected to said second member and a cooperating pawl spring biased into engagement with the teeth thereof to prevent rotation of said second member due to spring tension, and manually actuable means for manually moving and thereafter restraining both of said pawls out of engagement with their associated ratchet wheels to permit unrestricted limits of rotation of said axle member in both directions thereof but manually actuable to release said pawls to engage their associated ratchet wheels and thereby permit rotation of said axle member only within a preselected range of rotational motion and only in one direction thereof.

References Cited in the file of this patent

UNITED STATES PATENTS

| | | |
|---|---|---|
| 144,681 | Karg | Nov. 18, 1873 |
| 187,111 | Dutcher | Feb. 6, 1877 |
| 226,881 | Richardson et al. | Apr. 27, 1880 |

FOREIGN PATENTS

| | | |
|---|---|---|
| 315,608 | Germany | Nov. 10, 1919 |